United States Patent
Jeon et al.

(10) Patent No.: US 12,305,701 B2
(45) Date of Patent: May 20, 2025

(54) COMPRESSOR AND CHILLER SYSTEM HAVING THE SAME

(71) Applicant: LG ELECTRONICS INC., Seoul (KR)

(72) Inventors: Byoungjun Jeon, Seoul (KR); Yoonjei Hwang, Seoul (KR); Kyeongseok Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 820 days.

(21) Appl. No.: 17/172,678

(22) Filed: Feb. 10, 2021

(65) Prior Publication Data

US 2021/0254876 A1    Aug. 19, 2021

(30) Foreign Application Priority Data

Feb. 17, 2020 (KR) .................. 10-2020-0019269

(51) Int. Cl.
*F16C 17/24* (2006.01)
*F04D 27/00* (2006.01)
(Continued)

(52) U.S. Cl.
CPC .......... *F16C 17/246* (2013.01); *F04D 27/001* (2013.01); *F04D 27/004* (2013.01);
(Continued)

(58) Field of Classification Search
CPC .... F04D 27/001; F04D 27/004; F04D 27/008; F04D 27/009; F04D 29/051;
(Continued)

(56) References Cited

U.S. PATENT DOCUMENTS

| 4,928,561 | A  | * | 5/1990 | Fouche   | F16C 32/0472 310/90.5 |
| 6,727,617 | B2 | * | 4/2004 | McMullen | F16C 32/0465 310/90.5 |

(Continued)

FOREIGN PATENT DOCUMENTS

| CN | 103649546 | 3/2014 |
| CN | 103688144 | 3/2014 |

(Continued)

OTHER PUBLICATIONS

Korean Notice of Allowance issued in Application No. 10-2020-0019269 dated Jul. 28, 2021.

(Continued)

*Primary Examiner* — Charles G Freay
*Assistant Examiner* — Lilya Pekarskaya
(74) *Attorney, Agent, or Firm* — KED & ASSOCIATES

(57) ABSTRACT

A compressor including one or more impellers configured to draw in a refrigerant in an axial direction and to compress the refrigerant in a centrifugal direction; a rotary shaft, to which the one or more impellers and a motor that rotates the one or more impellers are coupled; a thrust bearing that supports the rotary shaft; a bearing state sensor configured to detect a surface roughness of the thrust bearing; and a controller configured to control the motor based on the surface roughness of the thrust bearing.

20 Claims, 9 Drawing Sheets

(51) Int. Cl.
 *F04D 29/051* (2006.01)
 *F04D 29/056* (2006.01)
(52) U.S. Cl.
 CPC ......... *F04D 27/008* (2013.01); *F04D 27/009* (2013.01); *F04D 29/051* (2013.01); *F04D 29/056* (2013.01); *F05D 2240/50* (2013.01); *F05D 2270/30* (2013.01); *F16C 2233/00* (2013.01)
(58) Field of Classification Search
 CPC ............... F04D 29/0513; F16C 17/246; F16C 2233/00; F25B 31/00
 See application file for complete search history.

(56) References Cited

U.S. PATENT DOCUMENTS

| | | | | |
|---|---|---|---|---|
| 2009/0136335 | A1* | 5/2009 | Nakazeki | F25B 9/004 |
| | | | | 415/13 |
| 2015/0285134 | A1* | 10/2015 | Palko | F04D 29/422 |
| | | | | 60/605.1 |
| 2017/0097005 | A1* | 4/2017 | Hossain | F04D 27/004 |
| 2017/0260987 | A1* | 9/2017 | Onodera | F04D 29/685 |
| 2017/0277166 | A1* | 9/2017 | Popa-Simil | G05B 19/4184 |
| 2018/0058460 | A1* | 3/2018 | Lee | F04D 29/058 |
| 2018/0195520 | A1* | 7/2018 | Oh | F04D 27/002 |
| 2019/0271584 | A1* | 9/2019 | Hedin | G01H 1/003 |
| 2019/0277300 | A1* | 9/2019 | Lee | F25B 31/026 |

FOREIGN PATENT DOCUMENTS

| | | |
|---|---|---|
| CN | 108026932 | 5/2018 |
| CN | 108138791 | 6/2018 |
| CN | 108713100 | 10/2018 |
| CN | 109281846 | 1/2019 |
| CN | 109707639 | 5/2019 |
| CN | 110192039 | 8/2019 |
| CN | 110414069 | 11/2019 |
| JP | 05-133742 | 5/1993 |
| JP | 2009-150262 | 7/2009 |
| JP | 2014-167421 | 9/2014 |
| JP | 5749954 | 7/2015 |
| KR | 10-1084477 | 11/2011 |
| KR | 10-2016-0087299 | 7/2016 |
| WO | WO 2019/244659 | 12/2019 |

OTHER PUBLICATIONS

Development of Cam Service Life Prediction Software published Jan. 5, 2003; pp. 1-68.
Chinese Office Action dated May 16, 2022 issued in Application No. 202110190336.9 (English translation attached).

* cited by examiner

COMPRESSOR AND CHILLER SYSTEM HAVING THE SAME

CROSS-REFERENCE TO RELATED APPLICATION(S)

This application claims priority under 35 U.S.C. § 119 to Korean Application No. 10-2020-0019269 filed on Feb. 17, 2020, whose entire disclosure are hereby incorporated by reference.

BACKGROUND OF THE INVENTION

1. Field of the Invention

The present disclosure relates to a compressor and a chiller system having the same.

2. Description of the Related Art

Generally, chiller systems supply chilled water to demand sources of chilled water, and provide cooling by heat exchange between a refrigerant, circulating through a refrigeration system, and chilled water circulating between the demand sources and the refrigeration system. As large-capacity cooling equipment, the chiller systems may be installed in large buildings and the like.

Korean Registered Patent No. 10-1084477 discloses a general chiller system. The chiller system disclosed in the related art has a problem in that surge occurs in a rotating compressor. Surge takes place when a compression ratio of the compressor is higher than a flow rate of the refrigerant, and causes an irregular flow of the refrigerant as a rotating body of the compressor rotates idle. During the occurrence of surge, the compressor does not produce a higher pressure than a pressure resistance of the system.

Accordingly, when the surge occurs, the refrigerant repeatedly backflows, thereby frequently causing damage to the compressor.

Therefore, there is a need for a method to prevent damage to the compressor caused by the occurrence of surge in the chiller system.

Furthermore, in a compressor employing a general thrust bearing (gas foil bearing), the thrust bearing is worn down and abnormality in the thrust bearing occurs frequently. The related art has problems in that the bearing may be damaged and the damage may not be detected in advance, such that the chiller system may not be operated continuously, and efficiency of the chiller system is reduced.

SUMMARY OF THE INVENTION

It is an object of the present disclosure to provide a compressor, in which by preventing in advance an abnormal operation of a compressor which is caused by abrasion of a bearing, and by measuring a degree of abrasion of the bearing, a service life and an estimated repair time of the compressor may be predicted.

It is another object of the present disclosure to provide a compressor, in which damage to the compressor and the bearing may be prevented when unexpected abnormality occurs in the compressor.

It is yet another object of the present disclosure to provide a compressor, in which when eccentricity of a rotating shaft occurs in the compressor, a refrigerant discharged from the compressor is supplied to the eccentric side, thereby preventing eccentricity of the rotating shaft and damage to the compressor and the bearing.

The objects of the present disclosure are not limited to the aforementioned objects and other objects not described herein will be clearly understood by those skilled in the art from the following description.

In order to achieve the above objects, a compressor according to an embodiment of the present disclosure is characterized in that a service life and an estimated repair time of the compressor may be calculated based on surface roughness of the thrust bearing.

In addition, the compressor according to an embodiment of the present disclosure is characterized in that the refrigerant, discharged from the compressor, is supplied to an impeller to which the rotating shaft is eccentric.

Specifically, in accordance with an aspect of the present disclosure, the above and other objects can be accomplished by providing a compressor, including: one or more impellers configured to draw in a refrigerant in an axial direction and to compress the refrigerant in a centrifugal direction; a rotating shaft, to which the impellers and a motor rotating the impellers are coupled; a thrust bearing supporting the rotating shaft; a bearing state sensor configured to detect surface roughness of the thrust bearing; and a controller configured to control the motor based on the surface roughness of the thrust bearing.

In response to a surface roughness value of the thrust bearing exceeding a first reference roughness value, the controller may set an RPM of the motor to be less than a normal RPM.

In response to a surface roughness value of the thrust bearing exceeding a second reference roughness value, the controller may control the motor to stop.

The compressor may further include an output unit configured to transmit visual or audio information to a user, wherein in response to a surface roughness value of the thrust bearing exceeding the first reference roughness value, the controller may control the output unit to output a warning.

In addition, the compressor may further include an output unit configured to transmit visual or audio information to a user, wherein in response to a surface roughness value of the thrust bearing exceeding the first reference roughness value, the controller may predict a service life of the compressor based on the surface roughness value of the thrust bearing, and may control the service life of the compressor through the output unit.

Further, the bearing state sensor may include a camera configured to capture an image of one surface of the thrust bearing.

The bearing state sensor may include: a light emitter configured to emit light onto one surface of the thrust bearing; and a light receiver configured to receive light returning by being reflected from the one surface of the thrust bearing after the light is emitted by the light emitter.

The bearing state sensor may direct a magnetic field toward the thrust bearing, and may detect a change in inductance according to surface roughness of the thrust bearing.

The impellers may include a first impeller, and a second impeller configured to re-compress the refrigerant compressed by the first impeller, wherein the compressor may further include a bypass unit configured to selectively supply at least a portion of the refrigerant, discharged from the second impeller, to the first impeller or the second impeller.

In addition, the compressor may further include a gap sensor configured to detect a position of the rotating shaft, wherein the controller may determine whether the rotating shaft is eccentric based on position information of the rotating shaft, and may control the bypass unit to supply the refrigerant to the impeller to which the rotating shaft is eccentric.

In accordance with another aspect of the present disclosure, the above and other objects can be accomplished by providing a compressor, including: a first impeller configured to draw in a refrigerant in an axial direction and to compress the refrigerant, and a second impeller configured to re-compress the refrigerant compressed by the first impeller; a rotating shaft, to which the first and second impellers and a motor rotating the first and second impellers are coupled; a gap sensor configured to detect a position of the rotating shaft; a bypass unit configured to selectively supply a portion of the refrigerant, discharged from the second impeller, to the first impeller or the second impeller; and a controller configured to control the bypass unit based on the position of the rotating shaft which is detected by the gap sensor.

The controller may determine whether the rotating shaft is eccentric based on position information of the rotating shaft, and may control the bypass unit to supply the refrigerant to the impeller to which the rotating shaft is eccentric.

In response to the rotating shaft being eccentric to the first impeller, the controller may control the bypass unit to supply a portion of the refrigerant, discharged from the second impeller, to the first impeller.

In response to the rotating shaft being eccentric to the second impeller, the controller may control the bypass unit to supply a portion of the refrigerant, discharged from the second impeller, to the second impeller.

The bypass unit may include: a first bypass pipe connecting an outlet end of the second impeller and an inlet end of the first impeller; a second bypass pipe connecting the outlet end of the second impeller and an inlet end of the second impeller; a first bypass valve opening and closing the first bypass pipe; and a second bypass valve opening and closing the second bypass pipe.

In response to the rotating shaft being eccentric to the second impeller, the controller may open the second bypass valve and may close the first bypass valve.

In response to the rotating shaft being eccentric to the first impeller, the controller may open the first bypass valve and may close the second bypass valve.

Further, a chiller system according to the present disclosure includes the above compressors.

Other detailed matters of the exemplary embodiments are included in the detailed description and the drawings.

The compressor and the chiller system having the same according to the present disclosure have one or more of the following effects.

First, in the present disclosure, by predicting a service life of the bearing based on surface roughness of the bearing, an abnormal operation of the compressor which is caused by abrasion of the bearing may be prevented in advance, and a service life and an estimated repair time of the compressor may be predicted.

Second, in the present disclosure, the position of the rotating shaft may be adjusted to prevent eccentricity, thereby improving efficiency of the compressor and preventing damage to the compressor and the bearing.

Third, in the present disclosure, a portion of the refrigerant, discharged from the compressor, is supplied again toward the impeller to which the rotating shaft is eccentric, thereby preventing eccentricity of the rotating shaft at a low cost in a simple structure.

The effects of the present disclosure are not limited to the aforesaid, and other effects not described herein will be clearly understood by those skilled in the art from the following description of the appended claims.

DETAILED DESCRIPTION OF THE PREFERRED EMBODIMENTS

Figure 1:
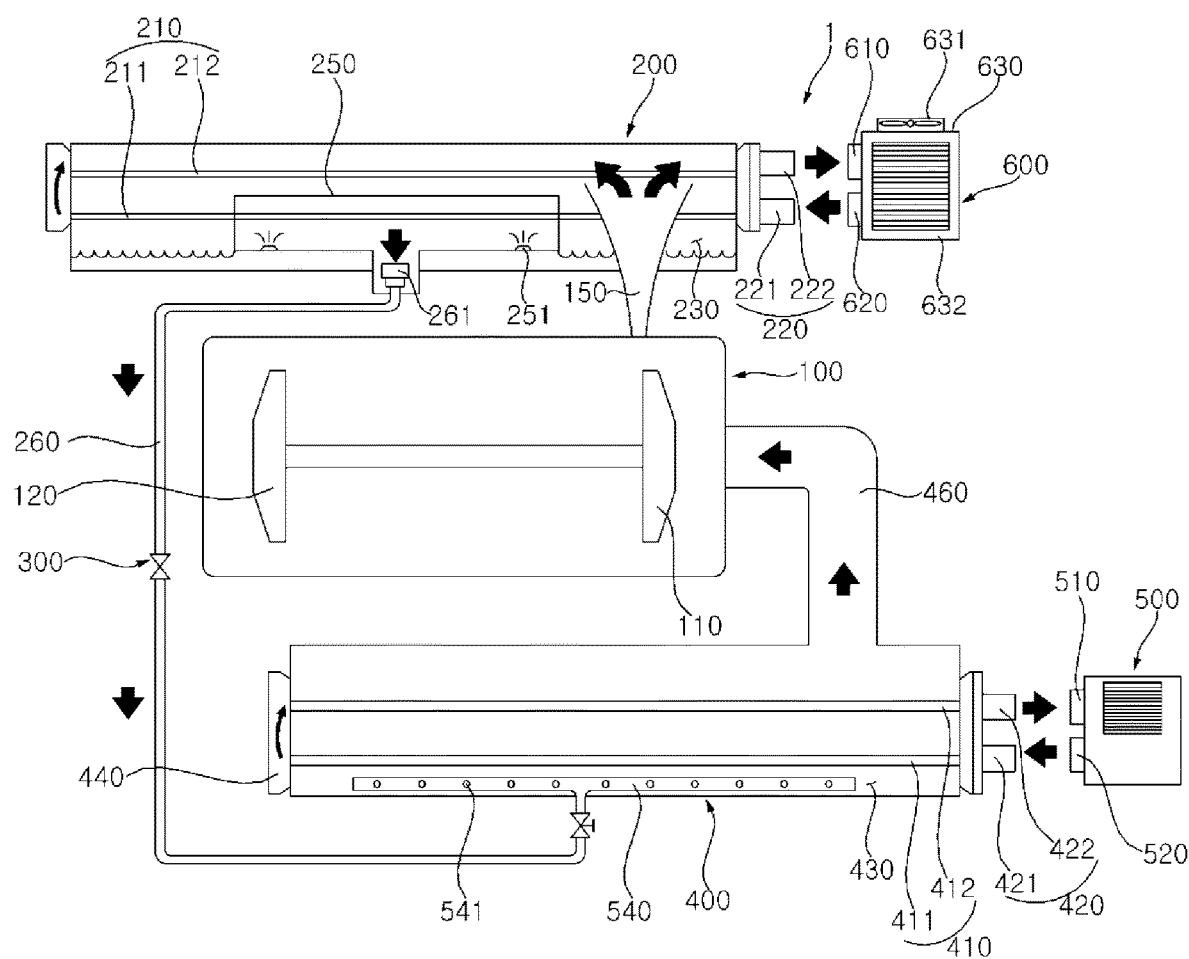
FIG. 1 is a diagram illustrating a chiller system according to an embodiment of the present disclosure.

Advantages and features of the present disclosure and methods for accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, the same reference numbers will be used throughout the drawings to refer to the same or like parts.

Spatially-relative terms such as "below", "beneath", "lower", "above", or "upper" may be used herein to describe one element's relationship to another element as illustrated in the Figures. It will be understood that spatially-relative terms are intended to encompass different orientations of the device in addition to the orientation depicted in the Figures. For example, if the device in one of the figures is turned over, elements described as "below" or "beneath" other elements would then be oriented "above" the other elements. The exemplary terms "below" or "beneath" can, therefore, encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, the thickness or size of each constituent element is exaggerated, omitted, or schematically illustrated for convenience of description and clarity. Also, the size or area of each constituent element does not entirely reflect the actual size thereof.

Hereinafter, preferred embodiments of the present disclosure will be described with reference to the accompanying drawings.

Embodiments of the present disclosure will be described below with reference to the accompanying drawings for explaining a compressor.

FIG. 1 is a diagram illustrating a chiller system including a compressor 100 of the present disclosure. The compressor 100 according to an embodiment of the present disclosure may not only function as part of a chiller system, but may also be included in an air conditioner and any other device as long as the device may compress a gaseous material.

Referring to FIG. 1, a chiller system 1 according to an embodiment of the present disclosure includes: a compressor 100 configured to compress a refrigerant; a condenser 200 configured to condense the refrigerant by heat-exchange between the refrigerant, compressed by the compressor 100, and a coolant; an expander 300 configured to expand the refrigerant condensed by the condenser 200; an evaporator 400 configured to cool chilled water while evaporating the refrigerant by heat-exchange between the refrigerant, expanded by the expander 300, and the chilled water.

In addition, the chiller system 1 according to an embodiment of the present disclosure may further include: a coolant unit 600 configured to heat the coolant by heat-exchange between the compressed refrigerant and the coolant at the condenser 200; and an air conditioning unit 500 configured to cool the chilled water by heat-exchange between the expanded refrigerant and the chilled water at the evaporator 400.

The condenser 200 provides a space for heat-exchange between a high-pressure refrigerant, compressed by the compressor 100, and the coolant introduced from the coolant unit 600. The high-pressure refrigerant may be condensed by heat-exchange with the coolant.

The condenser 200 may include a shell-tube type heat exchanger. Specifically, the high-pressure refrigerant, compressed by the compressor 100, may be introduced into a condensing space 230, corresponding to an internal space of the condenser 200, through a condenser connection passage 150. Further, a coolant passage 210, through which the coolant introduced from the coolant unit 600 may flow, is formed in the condensing space 230.

The coolant passage 210 may include a coolant inlet passage 211, into which the coolant is introduced from the coolant unit 600, and a coolant discharge passage 212, through which the coolant is discharged to the coolant unit 600. The coolant introduced into the coolant inlet passage 211 may be heat-exchanged with the refrigerant inside the condensing space 230, and then may pass through a coolant connection passage 240, formed at one end inside the condenser 200 or formed outside thereof, to be introduced into the coolant discharge passage 212.

The coolant unit 600 and the condenser 200 may be connected to each other through a coolant tube 220. The coolant tube 220 may serve as a flow path of the coolant between the coolant unit 600 and the condenser 200, and may be made of a rubber material and the like so as to prevent the coolant from leaking to the outside.

The coolant tube 220 includes a coolant inlet tube 221 connected to the coolant inlet passage 211, and a coolant discharge tube 222 connected to the coolant discharge passage 212. As for the overall coolant flow, after heat-exchange with air or a liquid at the coolant unit 600, the coolant is introduced into the condenser 200 through the coolant inlet tube 221. The coolant introduced into the condenser 200 sequentially passes through the coolant inlet passage 211, the coolant connection passage 240, and the coolant discharge passage 212 which are provided in the condenser 200, so as to be heat-exchanged with the refrigerant introduced into the condenser 200, and then passes through the coolant discharge tube 222 again to flow into the coolant unit 600.

The coolant, having absorbed heat from the refrigerant by heat-exchange at the condenser 200, may be air-cooled by the coolant unit 600. The coolant unit 600 includes a main body 630, a coolant inlet pipe 610 serving as an inlet through which the coolant having absorbed heat is introduced, and a coolant discharge pipe 620 serving as an outlet through which the coolant after being cooled in the coolant unit 600 is discharged.

By using air, the coolant unit 600 may cool the coolant introduced into the main body 630. Specifically, the main body 630 has a fan generating an air flow, an air outlet 631 through which air is discharged, and an air inlet 632 through which air flows into the main body 630.

Air, discharged through the air outlet 631 after being heat-exchanged, may be used for heating. The refrigerant, condensed after being heat-exchanged at the condenser 200, stagnates in a lower portion of the condensing space 230. The stagnant refrigerant is fed into a refrigerant box 250, provided inside the condensing space 230, to flow into the expander 300.

The refrigerant box 250 is introduced into a refrigerant inlet 251, and the introduced refrigerant may be discharged to an evaporator connection passage 260. The evaporator connection passage 260 has an evaporator connection passage inlet 261 which may be disposed below the refrigerant box 250.

The evaporator 400 may include an evaporation space 430 in which heat-exchange takes place between the refrigerant, expanded by the expander 300, and chilled water. In the evaporator connection passage 260, the refrigerant having passed through the expander 300 is connected to a refrigerant injection device 450 provided in the evaporator 400, and passes through a refrigerant injection hole 451 to spread evenly inside the evaporator 400.

Further, in the evaporator 400, a cold water passage 410 is provided which includes: a cold water inlet passage 411, through which cold water flows into the evaporator 400; and a cold water discharge passage 412, through which the cold water is discharged outside of the evaporator 400.

The cold water may be introduced or discharged through a cold water tube 420 communicating with an air conditioning unit 500 provided outside of the evaporator 400. The cold water tube 420 includes a cold water inlet tube 421, serving as a passage through which cold water inside the air conditioning unit 500 flows toward the evaporator 400, and a cold water discharge tube 422 serving as a passage through which cold water after being heat-exchanged at the evaporator 400 flows toward the air conditioning unit 500. That is, the cold water inlet tube 421 communicates with the cold water inlet passage 411, and the cold water discharge tube 422 communicates with the cold water discharge passage 412.

As for the flow of cold water, after passing through the air conditioning unit 500, the cold water inlet tube 421, and the cold water inlet passage 411, the cold water passes through a cold water connection passage 440 provided at one end inside the evaporator 400 or provided outside thereof, and then flows into the air conditioning unit 500 again through the cold water discharge passage 412 and the cold water discharge tube 422.

The air conditioning unit 500 cools the cold water using a refrigerant. The cooled cold water may absorb heat from air in the air conditioning unit 500 to cool the indoor space. The air conditioning unit 500 may include a cold water discharge pipe 520 communicating with the cold water inlet tube 421, and a cold water inlet pipe 510 communicating with the cold water discharge tube 422. After being heat-exchanged at the evaporator 400, the refrigerant may flow into the compressor 100 again through a connection passage 460 of the compressor 100.

Hereinafter, a compressor will be described in detail with reference to FIGS. 2 and 3.

A compressor 10 according to an embodiment of the present disclosure is provided as a two-stage centrifugal compressor. However, this is merely an example of a compressor, and the compressor 10 according to the present disclosure is not limited thereto.

The compressor 10 has a shell 101, and shell covers 102 and 103 coupled to the shell 101. The shell covers 102 and 103 may be understood as part of the shell 101 in a broader sense.

Specifically, the shell 101 has an approximately cylindrical shape, and both sides thereof are open. The shell covers 102 and 103 may be coupled to both open sides of the shell 101.

The shell covers 102 and 103 may include a first shell cover 102 coupled to one open side of the shell 101, and a second shell cover 103 coupled to the other open side of the shell 101. An internal space of the shell 101 may be sealed by the shell covers 102 and 103.

Figure 2:
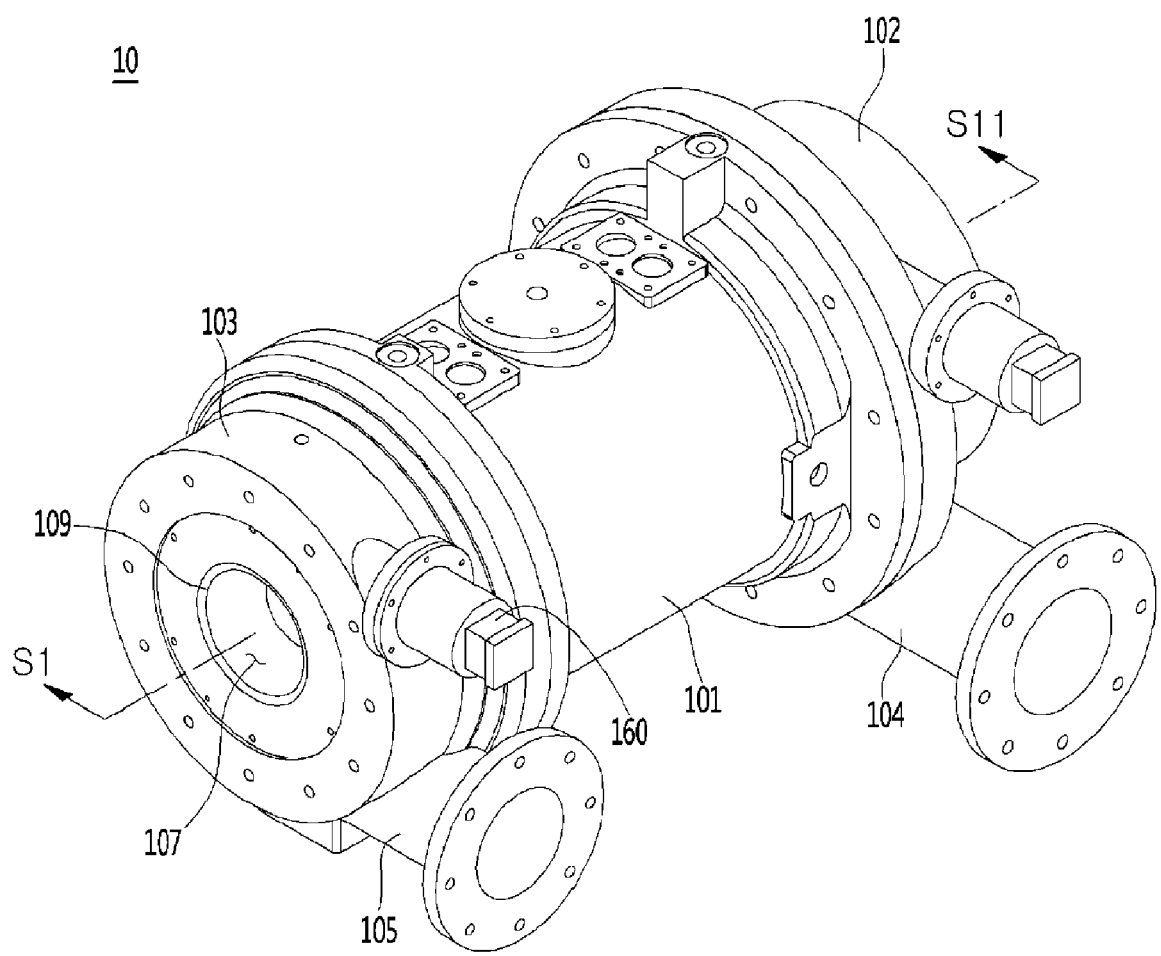
FIG. 2 is a perspective view of a compressor according to an embodiment of the present disclosure.
Figure 3:
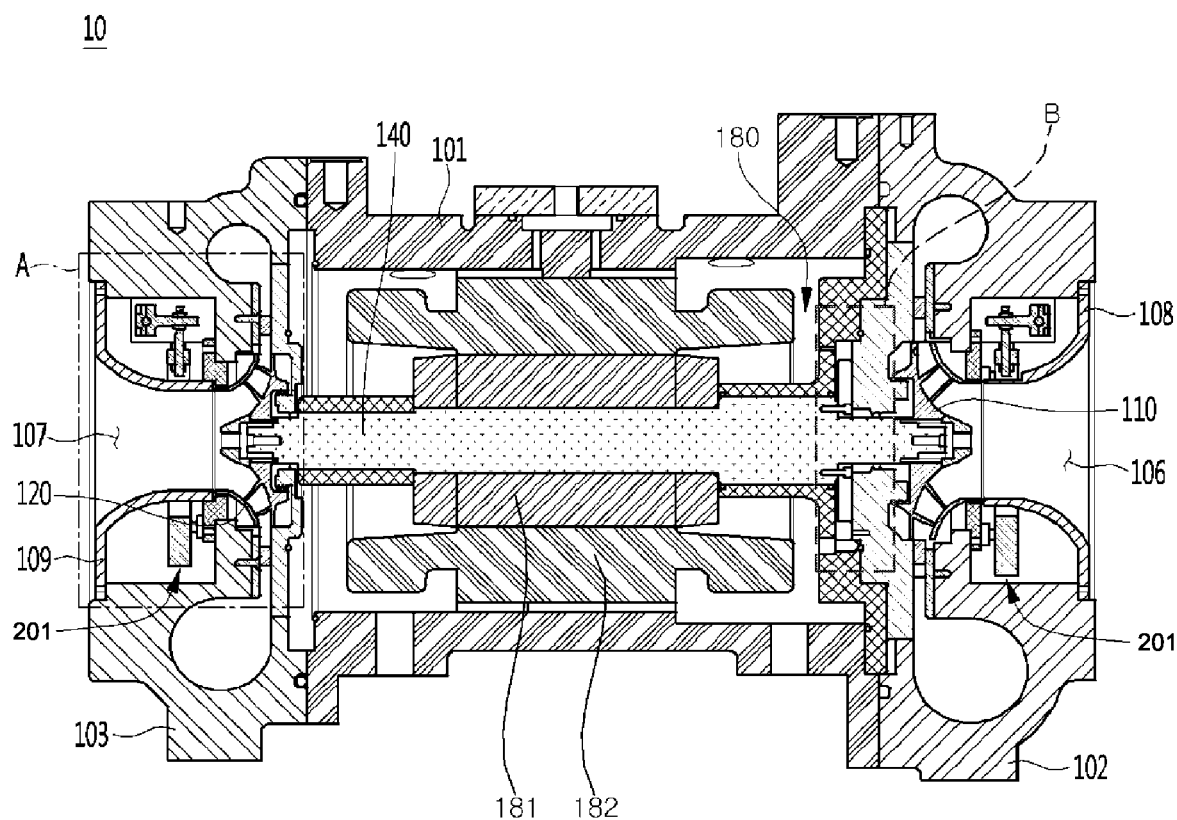
FIG. 3 is a cross sectional view as taken along line S1-S11 of FIG. 2.

Based on FIGS. 2 and 3, the first shell cover 102 is located on the right side of the compressor 10, and the second shell cover 103 is located on the left side of the compressor 10. In other words, the first shell cover 102 and the second shell cover 103 may be disposed to face each other.

First and second suction pipes (not shown), through which the refrigerant is suctioned, and first and second discharge pipes 104 and 105, through which the compressed refrigerant is discharged, are coupled to the first and second shell covers 102 and 103, respectively. In FIGS. 2 and 3, the first and second suction pipes are omitted, and a first inlet 106 and a second inlet 107, to which the first and second suction pipes are connected respectively, are illustrated. The first discharge pipe 104 and the second inlet 107 are connected by a connection pipe 153.

In this case, the refrigerant flowing from the evaporator 40 is introduced through the first inlet 106. The first inlet 106 is connected to a compressor connection passage 460.

The refrigerant introduced into the first shell cover 102 through the first inlet 106 is discharged through the first discharge pipe 104. Further, the first discharge pipe 104 is connected to the second inlet 107, such that the refrigerant discharged through the first discharge pipe 104 flows to the second inlet 107.

That is, the refrigerant discharged from the first shell cover 102 is introduced through the second inlet 107. The refrigerant, introduced into the second shell cover 103 through the second inlet 107, is discharged through the second discharge pipe 105, and then flows to the condenser 20. The second discharge pipe 105 is connected to the condenser connection passage 150.

In addition, a control box 160 may be provided at the first and second shell covers 102 and 103. The control box 160 may protrude from one side to be used by a user to control each component. Referring to FIG. 2, the control box 160 may be provided at the first and second shell covers 102 and 103, respectively.

Further, a first impeller 110 and a second impeller 120 may be provided for the first shell cover 102 and the second shell cover 103, respectively, so as to compress the refrigerant. Specifically, the first and second impellers 110 and 120 may compress the refrigerant introduced through the first and second inlets 106 and 107 in an axial direction, and may discharge the refrigerant through the first and second discharge pipes 104 and 105 which are disposed in a radial direction.

The refrigerant is primarily compressed by the first impeller 110, and the refrigerant compressed by the first impeller 110 is then compressed by the second impeller 120.

Furthermore, a first shroud 108 and a second shroud 109 for guiding a flow of the refrigerant may be provided at the first inlet 106 and the second inlet 107, respectively. Specifically, the first and second shrouds 108 and 109 are provided so that a width thereof decreases linearly from the first and second inlets 106 and 107 to the first and second impellers 110 and 120.

A rotating shaft 140 and a motor 180 for providing a driving force to the first and second impellers 110 and 120 are provided in the shell 101. Particularly, the motor 180 may be provided as an oilless motor.

The motor 180 includes: a stator 182 having an outer circumferential surface fixed to the shell 101, and an inner circumferential surface forming a rotating space; and a rotor 181 accommodated in the rotating space and rotating about the stator 182. The rotating shaft 140, which rotates together with the rotor 181 to transmit a rotational driving force of the rotor 181 to the impellers 110 and 120, is coupled to the rotor 181.

Specifically, a thrust bearing 170 may be disposed between the rotor 181 and the stator 182 provided at the motor 180.

In this case, the first and second impellers 110 and 120 are respectively coupled to both ends of the rotating shaft 140. The rotating shaft 140 is rotated by the motor 180, and the first and second impellers 110 and 120 coupled to the rotating shaft 140 may be rotated thereby.

In addition, a diffuser unit 201, controlling pressure by adjusting a degree of opening of a refrigerant flow passage, is included in the compressor 10 according to the embodiment of the present disclosure. The diffuser unit 201 may be provided at the first and second shell covers 102 and 103, respectively.

Hereinafter, the flow of the refrigerant in the second shell cover 103 will be described along with a description of the driving of the diffuser unit 201. The same may also apply to the first shell cover 102, and the following description will be given without distinguishing the "first" and "second" shell covers.

Figure 4A:
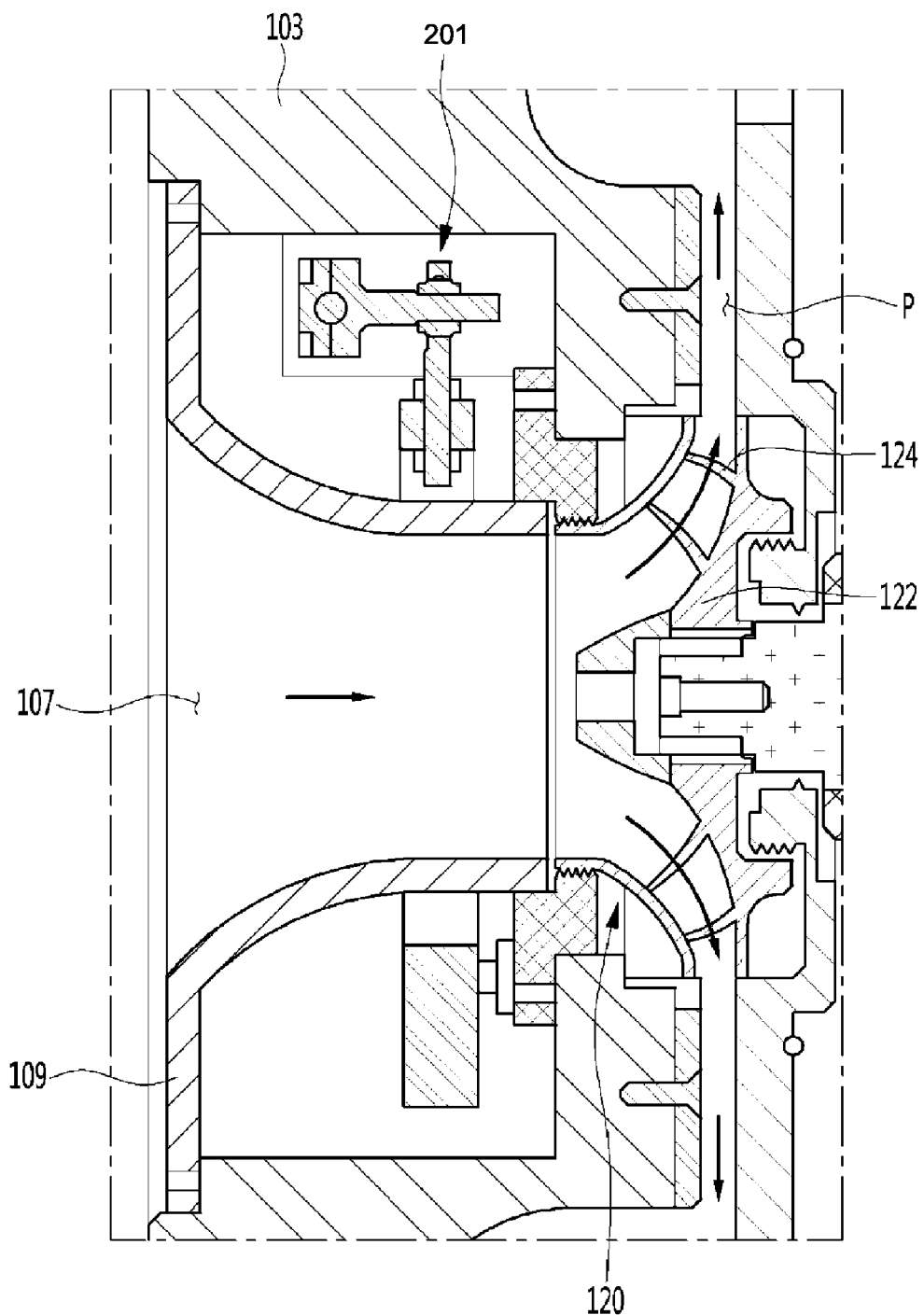
FIG. 4A is an enlarged view of region A of FIG. 3.

Referring to FIG. 4A, the impeller is provided with a hub 122 coupled to the rotating shaft 140, and a plurality of blades 124 coupled to the hub 122. The blades 124 are disposed radially with respect to the center of rotation, and may forcibly move the refrigerant in the radial direction, which is introduced in the axial direction.

In addition, the refrigerant, flowing in the radial direction of the impeller 120, passes through the internal space of the shell cover 103 along a predetermined refrigerant passage P, to be discharged through the discharge pipe 105. That is, the refrigerant, accelerated by the impeller 120, flows through the refrigerant passage P.

In this case, the diffuser unit 201 controls the pressure of the refrigerant by adjusting the degree of opening of the refrigerant passage P. By referring to the flow of the refrigerant which is indicated by an arrow, the refrigerant is introduced in the axial direction through the inlet 107. Further, the flow of the refrigerant may be naturally concentrated on a center portion through the shroud 109 provided at the inlet 107.

Furthermore, the refrigerant flows in the radial direction by the blades 124, to pass through the refrigerant passage P. In this manner, by reciprocating over a predetermined distance in the axial direction, the diffuser unit 201 may adjust the degree of opening of the refrigerant passage P. That is, the diffuser unit 201 may be disposed between a first state, in which the refrigerant passage P is opened to a maximum degree, and a second state in which the refrigerant passage P is opened to a minimum degree.

Figure 4B:
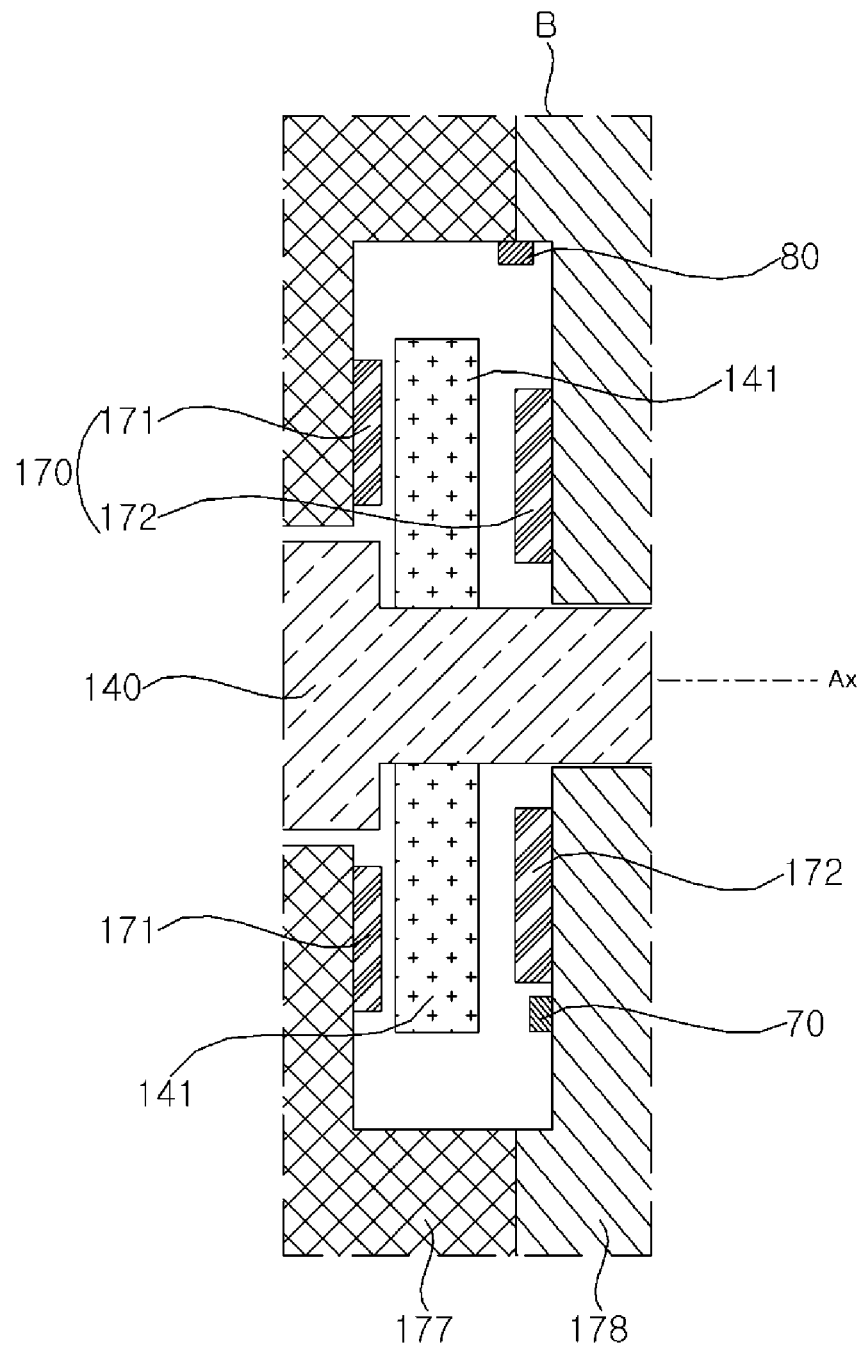
FIG. 4B is an enlarged view of region B of FIG. 3

Referring to FIG. 4B, the compressor 10 includes the thrust bearing 170 which restricts vibration of the rotating shaft 140 in an axial direction Ax.

In order to prevent the vibration of the rotating shaft 140 in the axial direction Ax (left-right direction), the thrust bearing 170 desirably has a predetermined area on a plane perpendicular to the axial direction Ax.

Specifically, the rotating shaft 140 may further include a thrust collar 141 providing a sufficient magnetic force so that the rotating shaft 110 may be moved with the magnetic force of the thrust bearing 170. The thrust collar 141 may have an area wider than a cross-sectional area of the rotating shaft 140 on a plane perpendicular to the axial direction Ax. The thrust collar 141 may extend in a rotation radius direction of the rotating shaft 140.

The thrust bearing 170 is made of a conductive material, around which a coil 143 is wound. The coil 143 serves as a magnet, with a current flowing through the wound coil 143.

The thrust bearing 170 may restrict movement of the rotating shaft 140, which is caused by vibration in the axial direction Ax, and may prevent the rotating shaft 140 from colliding with other components of the compressor 100.

Specifically, the thrust bearing 170 may include a first thrust bearing 171 and a second thrust bearing 172, which are disposed to surround the thrust collar 141 in the axial direction Ax of the rotating shaft 140. That is, the first thrust bearing 171, the thrust collar 141, and the second thrust bearing 172 are disposed in this order in the axial direction Ax of the rotating shaft 140.

More specifically, the second thrust bearing 172 is disposed closer to the impeller than the first thrust bearing 171, the first thrust bearing 171 is disposed further away from the impeller than the second thrust bearing 172, and at least a portion of the rotating shaft 140 is disposed between the first thrust bearing 171 and the second thrust bearing 172. The thrust collar 141 is desirably disposed between the first thrust bearing 171 and the second thrust bearing 172.

Accordingly, the first thrust bearing 171 and the second thrust bearing 172 may provide an effect of minimizing vibration of the rotating shaft 140 in a direction of the rotating shaft 140, by the action of the magnetic force and the thrust collar 141 having a wide area.

The thrust bearings 170 are provided in bearing housings 177 and 178.

A force of the thrust bearing 170 is inversely proportional to the square of a distance and is proportional to the square of a current. When surge occurs in the rotating shaft 140, a thrust force is generated toward the impeller 120 (toward the right side). In response to the force generated toward the right side, the rotating shaft 140 should be attracted with a maximum force using the magnetic force of the thrust bearing 170, but when the rotating shaft 140 is located in the middle (reference position C0) between the two thrust bearings 170, it is difficult to force the rotating shaft 140 to be moved rapidly to the reference position C0 in response to a sudden movement of the shaft.

A gap sensor 70 measures movement of the rotating shaft 140 in the axial direction Ax (left-right direction). In this case, the gap sensor 70 may also measure movement of the rotating shaft 140 in an up-down direction (direction perpendicular to the axial direction Ax). The gap sensor 70 may include a plurality of gap sensors 70.

For example, in order to measure the horizontal movement of the rotating shaft 140, the gap sensors 70 may be spaced apart in the axial direction Ax at one end in the axial direction Ax of the rotating shaft 140. Specifically, the gap sensors 70 may be spaced apart in the axial direction Ax from the thrust collar 141, to measure a distance from the thrust collar 141. The gap sensors 70 may be provided in the bearing housings 177 and 178.

In addition, the compressor 10 may include a bearing state sensor 80 for detecting surface roughness of the thrust bearing 170. The bearing state sensor 80 may measure a state (surface roughness) of the thrust bearing 170, and may provide the measured surface roughness value to the controller 700.

For example, the bearing state sensor 80 may detect surface roughness of one surface of the thrust collar 141. Specifically, the bearing state sensor 80 detects surface roughness of a surface intersecting (perpendicular to) the axial direction Ax on one surface of the thrust collar 141, or detects surface roughness of a surface opposite the thrust bearing on one surface of the thrust collar 141. The bearing state sensor 80 may be provided in the bearing housings 177 and 178.

For example, the bearing state sensor 80 may include a camera for capturing an image of one surface of the thrust bearing 170. The surface roughness of the thrust bearing 170 may be calculated based on the image input from the camera.

In another example, the bearing state sensor 80 may include: a light emitter (not shown) emitting light onto one surface of the thrust bearing 170; and a light receiver (not shown) receiving light which returns by being reflected from the one surface of the thrust bearing 170 after the light is emitted by the light emitter. By measuring the intensity of light returning to the light receiver, the bearing state sensor 80 may calculate reflectance and surface roughness of the thrust bearing 170.

The bearing state sensor 80 may be a device for directing a magnetic field toward the thrust bearing 170 and detecting a change in inductance according to the surface roughness of the thrust bearing 170.

The thrust force generated on the rotating shaft 140 toward the impeller 120 is so strong that a problem may occur in that when the rotating shaft 140 is located at the reference position C0, it is required to increase a current supply amount or to increase the size of the thrust bearing 170.

In order to solve the above problem, the present disclosure uses pressure of the refrigerant to move the rotating shaft 140 to the reference position when the rotating shaft 140 is eccentric.

In addition, in the present disclosure, by continuously observing the state of the thrust bearing 170, a service life and an estimated repair time of the thrust bearing 170 may be predicted.

Figure 5:
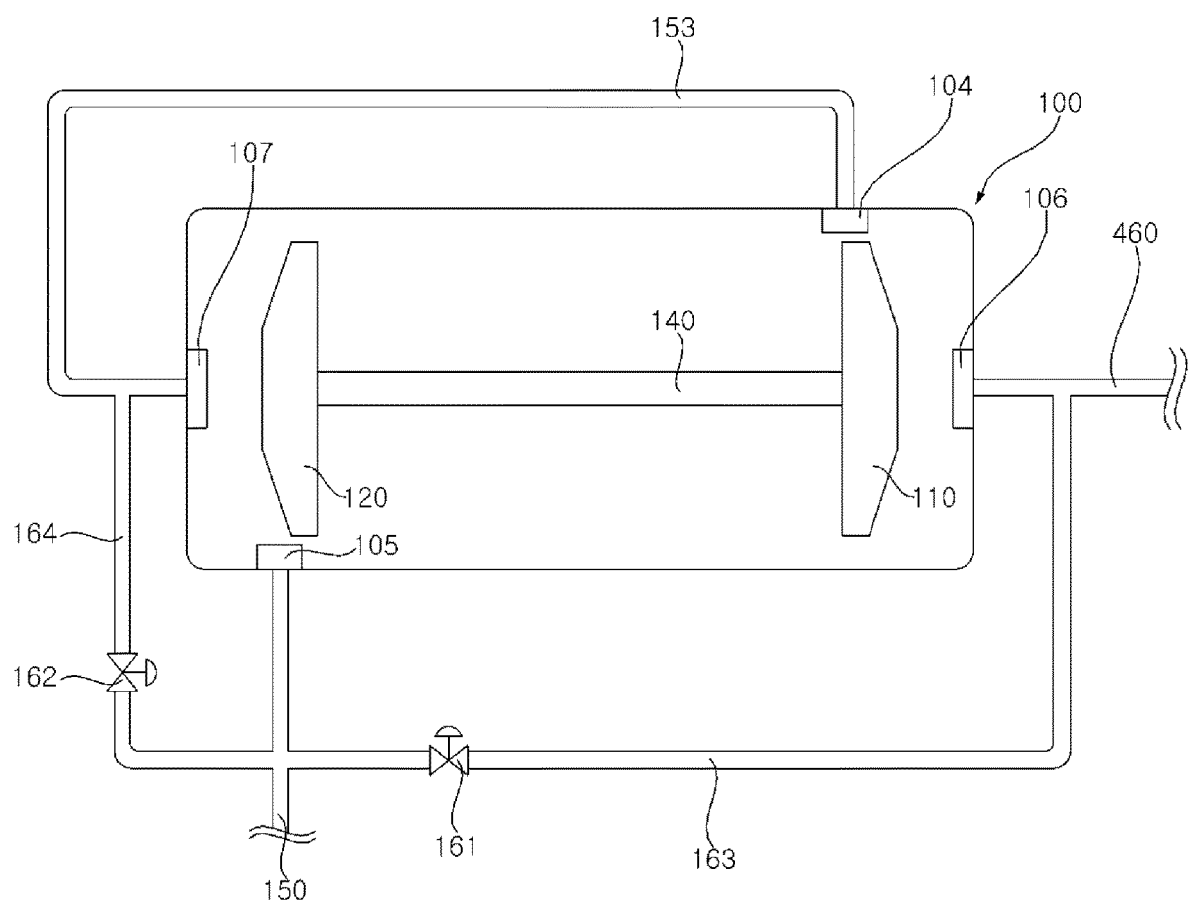
FIG. 5 is a diagram illustrating a compressor and pipes of the compressor, according to an embodiment of the present disclosure.

With reference to FIG. 5, a structure for moving the eccentric rotating shaft 140 to the reference position will be described below.

The compressor 10 of the present disclosure may further include a bypass unit selectively supplying at least a portion of the refrigerant, discharged from the first impeller 110, to the first impeller 100 or the second impeller 120.

The bypass unit supplies the refrigerant, discharged from the first impeller 110, again to the impeller to which the rotating shaft 140 is eccentric, thereby preventing eccentricity of the rotating shaft 140. Specifically, the bypass unit may include: a first bypass pipe 163 connecting an outlet end of the second impeller 120 and an inlet end of the first impeller 110; a second bypass pipe 164 connecting the outlet end of the second impeller 120 and an inlet end of the second impeller 120; a first bypass valve 161 opening and closing the first bypass pipe 163; and a second bypass valve 162 opening and closing the second bypass pipe 164.

The first bypass pipe 163 connects the outlet end of the second impeller 120 and the inlet end of the first impeller 110. Specifically, one end of the first bypass pipe 163 is connected to the second discharge pipe 105, and the other end of the first bypass pipe 163 is connected to the first inlet 106. One end of the first bypass pipe 163 is connected to the condenser connection passage 150, and the other end of the first bypass pipe 163 is connected to the compressor connection passage 460.

The second bypass pipe 164 connects the outlet end of the second impeller 120 and the inlet end of the second impeller 120. Specifically, one end of the second bypass pipe 164 is connected to the second discharge pipe 105, and the other end of the second bypass pipe 164 is connected to the second inlet 107. One end of the second bypass pipe 164 is connected to the condenser connection pipe 150, and the other end of the second bypass pipe 164 is connected to the connection pipe 153. The connection pipe 153 connects the first discharge pipe 104 and the second inlet 107.

The first bypass valve 161 is installed at the first bypass pipe 163, to open and close the first bypass pipe 163. The second bypass valve 162 is installed at the second bypass pipe 164, to open and close the second bypass pipe 164. The first bypass valve 161 and the second bypass valve 162 may be provided as electronic expansion valves, of which a degree of opening may be adjusted.

Figure 6:
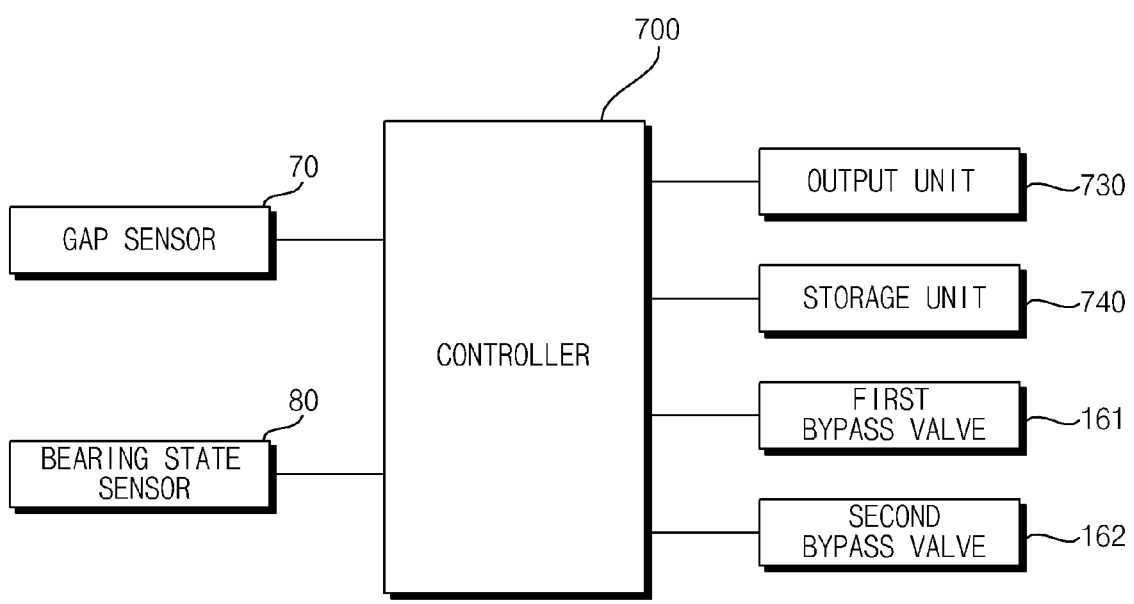
FIG. 6 is a block diagram illustrating a relationship between a controller and components connected thereto, according to an embodiment of the present disclosure.

Referring to FIG. 6, the compressor 10 of the present disclosure may further include a storage unit 740 storing a variety of information of the sensor, and an output unit 730 outputting information, which may be recognized by a user, based on information calculated by the controller 700.

The storage unit 740 may store values measured by the gap sensor 70 and the bearing state sensor 80. Data, such as a reference position C0, a normal position range (−C1 to +C1), an eccentric position, and the like, may be pre-stored in the storage unit 740. Further, the service life corresponding to a surface roughness value, an estimated repair time, and the like of the compressor 10 may be stored in the storage unit 740.

The output unit 730 may transmit visual or audio information to a user. The output unit 730 may include a display or a speaker.

The controller 700 controls the motor 180 based on the surface roughness of the thrust bearing 170. If a surface roughness value of the thrust bearing 170 exceeds a first reference roughness value, the thrust bearing 170 may set an RPM of the motor 180 to be lower than a normal RPM. Here, the normal RPM may be an RPM value determined as a user's setting or as a result of calculation of the controller 700.

If the thrust bearing 170 has a high surface roughness value, this indicates that slight damage is caused to the thrust bearing 170 due to friction with the thrust collar, such that the controller 700 may control the motor to operate at a low speed to prevent damage to the thrust bearing 170.

If a surface roughness value of the thrust bearing 170 exceeds a second reference roughness value, the controller 700 may control the motor to stop. If the thrust bearing 170 has a very high surface roughness value, the compressor 10 may be damaged, such that the controller 700 stops the motor.

In addition, the controller 700 may inform a user of a service life and an estimated repair time of the motor. If a surface roughness value of the thrust bearing 170 exceeds the first reference roughness value, the controller 700 may control the output unit 730 to output a warning.

In another example, if a surface roughness value of the thrust bearing 170 exceeds the first reference roughness value, the controller 700 may predict the service life of the compressor 10 based on the surface roughness value of the thrust bearing 170, and may control the output unit 730 to output the service life of the compressor 10. Further, if a surface roughness value of the thrust bearing 170 exceeds the first reference roughness value, the controller 700 may predict an estimated repair time of the compressor 10, and may control the output unit 730 to output the estimated repair time. The service life and the estimated repair time of the compressor 10 may be expressed as a function which is inversely proportional to the surface roughness value.

The controller 700 may determine whether the rotating shaft 140 is eccentric based on position information of the rotating shaft 140, and may control the bypass unit to supply the refrigerant to the impeller to which the rotating shaft 140 is eccentric.

Figure 7:
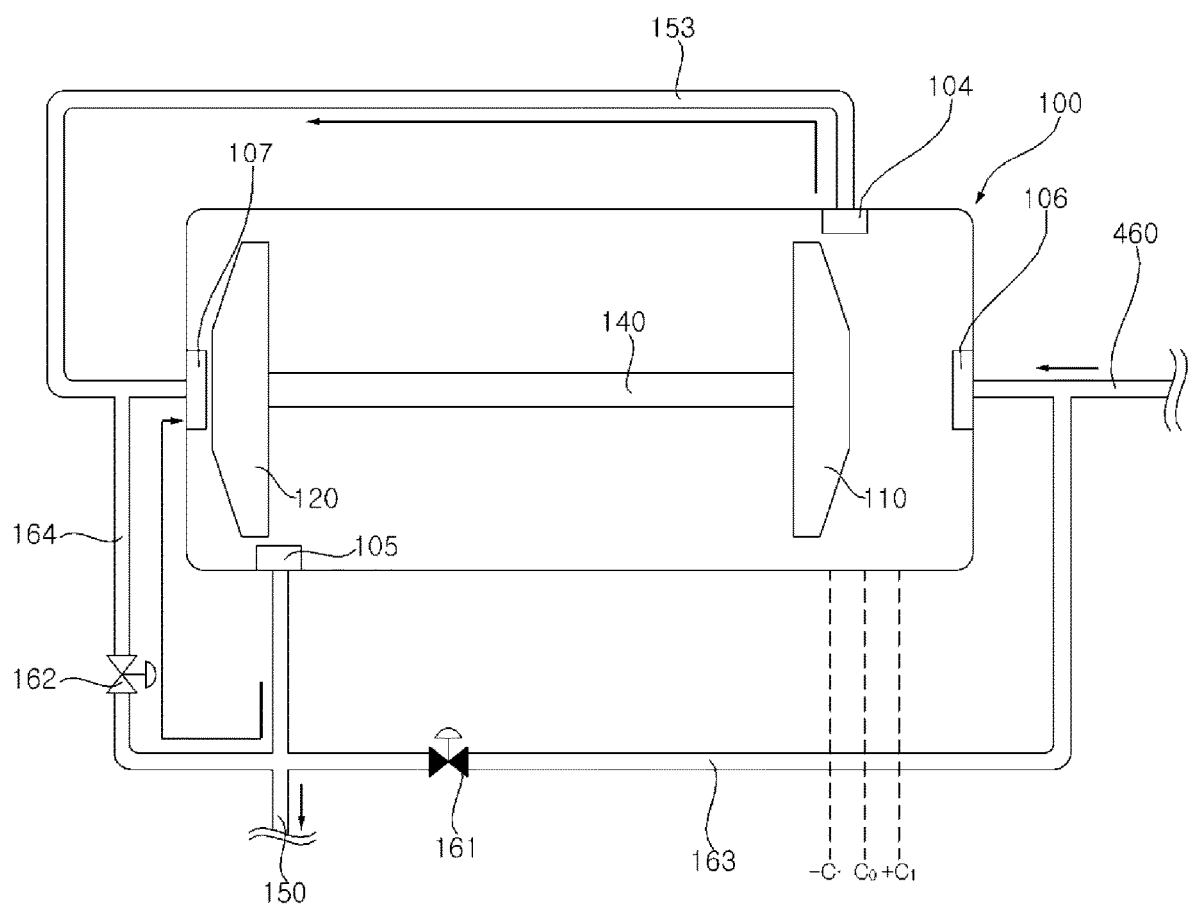
FIG. 7 is a diagram illustrating a flow of a refrigerant during operation of the compressor of FIG. 5.
Figure 8:
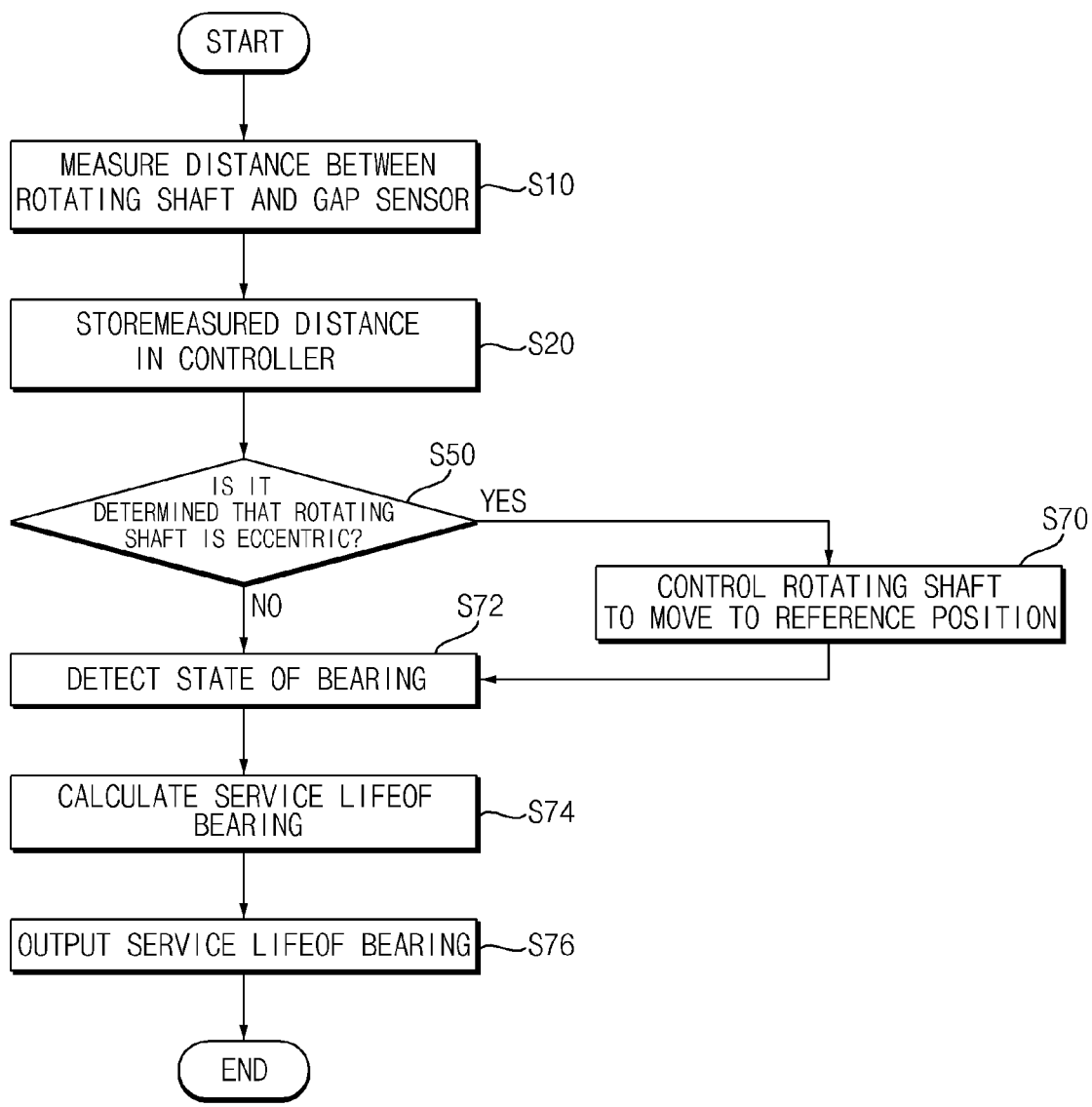
FIG. 8 is a flowchart illustrating a method of controlling a compressor according to an embodiment of the present disclosure.

Referring to FIG. 7, if a position of the rotating shaft 140, which is measured by the gap sensor 70, falls outside of the normal position range (−C1 to +C1), the controller 700 may determine that the rotating shaft 140 is eccentric.

If the position of the rotating shaft 140 is within the normal position range (−C1 to +C1), the controller 700 may determine that the rotating shaft 140 is not eccentric.

Here, the normal position range (−C1 to +C1) of the rotating shaft 140 refers to an area within a predetermined distance in left and right directions from the reference position C0 of the rotating shaft 140. When the rotating shaft 140 vibrates in the axial direction Ax during rotation due to various environmental and surrounding factors, the normal position range (−C1 to +C1) of the rotating shaft 140 may be a range in which the vibration is considered normal. Such normal position range (−C1 to +C1) is based on experimental values, and values in the normal position range (−C1 to +C1) may be set based on the Kurtosis or Skewness of positions of the rotating shaft 140. A method of setting the normal position range (−C1 to +C1) is not particularly limited.

Upon determining that the rotating shaft 140 is eccentric, the controller 700 may control the bypass unit to move the rotating shaft 140 toward the reference position C0.

The rotating shaft 140 being eccentric toward the first impeller 110 indicates that the rotating shaft 140 falls outside of the normal position range (−C1 to +C1) and moves toward the first impeller 110 (toward the right side) from the reference position.

The controller 700 determines whether the rotating shaft 140 is eccentric based on position information of the rotating shaft 140, and may control the bypass unit to supply the refrigerant to the impeller to which the rotating shaft 140 is eccentric. Specifically, when the rotating shaft 140 is eccentric to the first impeller 110, the controller 700 may control the bypass unit to supply a portion of the refrigerant, discharged from the first impeller 120, to the first impeller 120.

More specifically, if the rotating shaft 140 is eccentric to the first impeller 120, the controller 700 may open the second bypass valve 162 and may close the first bypass valve 161. In addition, if the rotating shaft 140 is eccentric to the first impeller 110, the controller 700 may open the first bypass valve 161 and may close the second bypass valve 162.

Furthermore, if the rotating shaft 140 is eccentric to the first impeller 120, the controller 700 may set an opening value of the second bypass valve 162 to be greater than an opening value of the first bypass value 161. In addition, if the rotating shaft 140 is eccentric to the first impeller 120, the controller 700 may set an opening value of the first bypass valve 161 to be greater than an opening value of the second bypass valve 162.

An embodiment of the present disclosure provides a method of controlling a compressor 100. FIG. 6 illustrates steps of the method of controlling the compressor 100 according to an embodiment of the present disclosure.

The method of controlling the compressor 100 according to an embodiment of the present disclosure includes: a step (a) of measuring a distance between the gap sensor 70 and the rotating shaft 140; a step (b) of determining eccentricity of the rotating shaft 140 based on the distance between the gap sensor 70 and the rotating shaft 140; and when eccentricity occurs in the rotating shaft 140, a step (c) of controlling the first bypass valve 161 and the second bypass valve 162 to move the rotating shaft 140 to the reference position C0.

In addition, the method of controlling the compressor 100 may further include a step (d) of detecting a state of the thrust bearing 170 and outputting a service life of the compressor 100.

Specifically, in the step (a) (S10), a distance between the rotating shaft 140 and the gap sensor 70 is measured (S10). Further, data measured by the gap sensor 70 is stored in the controller 700 (S20). Specifically, the data may be stored in the storage unit 740 connected to the controller 700.

Then, it is determined whether the rotating shaft 140 is eccentric based on the distance between the gap sensor 70 and the rotating shaft 140 (S50). The eccentricity of the rotating shaft 140 is described above. Specifically, the controller 700 may determine eccentricity of the rotating shaft 140 by comparing the data stored in the storage unit 740 and the values measured by the gap sensor 70.

Upon determining that the rotating shaft 140 is eccentric, the controller 700 may control the first bypass value 161 and the second bypass valve 162 to move the rotating shaft 140 to the reference position C0 (S70). Specifically, when the rotating shaft 140 is eccentric to the first impeller 120, the controller 700 may open the second bypass valve 162 and may close the first bypass valve 161. In addition, if the rotating shaft 140 is eccentric to the first impeller 110, the controller 700 may open the first bypass valve 161 and may close the second bypass valve 162. Further, when the rotating shaft 140 is eccentric to the first impeller 120, the controller 700 may set an opening value of the second bypass valve 162 to be greater than an opening value of the first bypass valve 161. Moreover, if the rotating shaft 140 is eccentric to the first impeller 110, the controller 700 may set an opening value of the first bypass valve 161 to be greater than an opening value of the second bypass valve 162.

When the eccentricity is removed from the rotating shaft 140, or when the rotating shaft 140 is not eccentric, or regardless of the eccentricity of the rotating shaft 140, a state of the thrust bearing 170 is detected (S72). Specifically, the controller 700 may calculate a surface roughness value of the thrust bearing 170 based on information input from the bearing state sensor 80.

The controller 700 may calculate a service life of the compressor 100, a service life of the bearing, and an estimated repair time thereof based on the state (surface roughness value) of the thrust bearing 170 (S74). The controller 700 may output the service life of the compressor 100, the service life of the bearing, and the estimated repair time thereof based on the state (surface roughness value) of the thrust bearing 170 through the output unit 730 (S76).

The compressor and the chiller system having the same according to the present disclosure have one or more of the following effects.

First, in the present disclosure, by predicting a service life of the bearing based on surface roughness of the bearing, an abnormal operation of the compressor which is caused by abrasion of the bearing may be prevented in advance, and a service life and an estimated repair time of the compressor may be predicted.

Second, in the present disclosure, the position of the rotating shaft may be adjusted to prevent eccentricity, thereby improving efficiency of the compressor and preventing damage to the compressor and the bearing.

Third, in the present disclosure, a portion of the refrigerant, discharged from the compressor, is supplied again toward the impeller to which the rotating shaft is eccentric, thereby preventing eccentricity of the rotating shaft at a low cost in a simple structure.

Although embodiments have been shown and described, it will be appreciated by those skilled in the art that various changes may be made to these embodiments without departing from the spirit and scope of the present disclosure as defined by the appended claims. Therefore, the scope of the present disclosure is not construed as being limited to the described embodiments, but is defined by the appended claims as well as equivalents thereto.

What is claimed is:

1. A compressor comprising:
one or more impellers configured to draw a refrigerant in an axial direction and to compress the refrigerant in a centrifugal direction;

a rotary shaft, to which the one or more impellers and a motor that rotates the one or more impellers are coupled;

a thrust bearing that supports the rotary shaft;

a bearing state sensor configured to detect a surface roughness of the thrust bearing; and a controller configured to control the motor based on the surface roughness of the thrust bearing, wherein, in response to a surface roughness value of the thrust bearing exceeding a first reference roughness value, the controller sets an RPM of the motor to be less than a normal RPM.

2. The compressor of claim 1, wherein in response to the surface roughness value of the thrust bearing exceeding a second reference roughness value, the controller controls the motor to stop.

3. The compressor of claim 1, further comprising an output unit configured to transmit visual or audio information to a user, wherein in response to the surface roughness value of the thrust bearing exceeding the first reference roughness value, the controller controls the output unit to output a warning.

4. The compressor of claim 1, further comprising an output unit configured to transmit visual or audio information to a user, wherein in response to the surface roughness value of the thrust bearing exceeding the first reference roughness value, the controller predicts a service life of the compressor based on the surface roughness value of the thrust bearing, and controls the service life of the compressor through the output unit.

5. The compressor of claim 1, wherein the bearing state sensor comprises a camera configured to capture an image of one surface of the thrust bearing.

6. The compressor of claim 1, wherein the bearing state sensor directs a magnetic field toward the thrust bearing, and detects a change in inductance according to the surface roughness of the thrust bearing.

7. The compressor of claim 1, wherein the one or more impellers comprise a first impeller, and a second impeller that is configured to re-compress the refrigerant compressed by the first impeller, and wherein the compressor further comprises a bypass unit including at least one bypass pipe configured to selectively supply at least a portion of the refrigerant, discharged from the second impeller, to the first impeller or the second impeller.

8. The compressor of claim 7, further comprising a gap sensor configured to detect a position of the rotary shaft, wherein the controller determines whether the rotary shaft is eccentric based on position information of the rotary shaft, and controls the bypass unit to supply the refrigerant to the impeller to which the rotary shaft is eccentric.

9. A compressor comprising:

a first impeller configured to draw a refrigerant in an axial direction and to compress the refrigerant, and a second impeller that is configured to re-compress the refrigerant compressed by the first impeller;

a rotary shaft, to which the first and second impellers and a motor that rotates the first and second impellers are coupled;

a gap sensor configured to detect a position of the rotary shaft;

a bypass unit including at least one bypass pipe configured to selectively supply a portion of the refrigerant, discharged from the second impeller, to the first impeller or the second impeller; and a controller configured to control the bypass unit based on the position of the rotary shaft which is detected by the gap sensor, wherein the bypass unit comprises:

a first bypass pipe that connects an outlet end of the second impeller and an inlet end of the first impeller;

a second bypass pipe that connects the outlet end of the second impeller and an inlet end of the second impeller;

a first bypass valve that opens and closes the first bypass pipe; and a second bypass valve that opens and closes the second bypass pipe.

10. The compressor of claim 9, wherein the controller determines whether the rotary shaft is eccentric based on position information of the rotary shaft, and controls the bypass unit to supply the refrigerant to the impeller to which the rotary shaft is eccentric.

11. The compressor of claim 9, wherein in response to the rotary shaft being eccentric to the first impeller, the controller controls the bypass unit to supply a portion of the refrigerant, discharged from the second impeller, to the first impeller.

12. The compressor of claim 9, wherein in response to the rotary shaft being eccentric to the second impeller, the controller controls the bypass unit to supply a portion of the refrigerant, discharged from the second impeller, to the second impeller.

13. The compressor of claim 9, wherein in response to the rotary shaft being eccentric to the second impeller, the controller opens the second bypass valve and closes the first bypass valve.

14. The compressor of claim 9, wherein in response to the rotary shaft being eccentric to the first impeller, the controller opens the first bypass valve and closes the second bypass valve.

15. A compressor comprising:

one or more impellers configured to draw a refrigerant in an axial direction and to compress the refrigerant in a centrifugal direction;

a rotary shaft, to which the one or more impellers and a motor that rotates the one or more impellers are coupled;

a thrust bearing that supports the rotary shaft;

a bearing state sensor configured to detect a surface roughness of the thrust bearing, wherein, in response to a surface roughness value of the thrust bearing exceeding a first reference roughness value, an RPM of the motor is set to be less than a normal RPM.

16. The compressor of claim 15, wherein the bearing state sensor comprises a camera configured to capture an image of one surface of the thrust bearing.

17. The compressor of claim 1, wherein, when the surface roughness value of the thrust bearing exceeds the first reference roughness value, the controller determines that there is a first level of damage to the thrust bearing and controls the motor to operate at a low RPM in comparison with the normal RPM of the motor to prevent further damage to the thrust bearing.

18. The compressor of claim 17, wherein, when the surface roughness value of the thrust bearing exceeds a second reference roughness value, the controller determines that there is a second level of damage to the thrust bearing and controls the motor to stop.

19. The compressor of claim 15, wherein, when the surface roughness value of the thrust bearing exceeds the first reference roughness value, the controller determines that there is a first level of damage to the thrust bearing and controls the motor to operate at a low RPM in comparison with the normal RPM of the motor to prevent further damage to the thrust bearing.

20. The compressor of claim 19, wherein, when the surface roughness value of the thrust bearing exceeds a second reference roughness value, the controller determines that there is a second level of damage to the thrust bearing and controls the motor to stop.

* * * * *